United States Patent
Bernard

(10) Patent No.: US 8,889,276 B2
(45) Date of Patent: Nov. 18, 2014

(54) METHOD FOR MANAGING THE OPERATION OF A HYBRID SYSTEM

(75) Inventor: Jerome Bernard, Baden (CH)

(73) Assignee: Belenos Clean Power Holding AG, Bienne (CH)

(*) Notice: Subject to any disclaimer, the term of this patent is extended or adjusted under 35 U.S.C. 154(b) by 35 days.

(21) Appl. No.: 13/483,894

(22) Filed: May 30, 2012

(65) Prior Publication Data
US 2012/0308850 A1    Dec. 6, 2012

(30) Foreign Application Priority Data

Jun. 1, 2011 (EP) .................................... 11168535

(51) Int. Cl.
*H01M 8/04* (2006.01)
*H01M 12/00* (2006.01)
*H01M 16/00* (2006.01)

(52) U.S. Cl.
CPC ...... *H01M 8/04753* (2013.01); *H01M 8/04873* (2013.01); *H01M 16/003* (2013.01); *Y02E 60/50* (2013.01)
USPC ............................................ 429/9; 429/428

(58) Field of Classification Search
USPC ............................................................ 429/9
See application file for complete search history.

(56) References Cited

U.S. PATENT DOCUMENTS

| | | | | |
|---|---|---|---|---|
| 6,847,188 | B2* | 1/2005 | Keskula et al. | 320/101 |
| 7,736,814 | B2* | 6/2010 | Igarashi et al. | 429/429 |
| 8,192,884 | B2* | 6/2012 | Hasuka | 429/442 |
| 2003/0044658 | A1 | 3/2003 | Hochgraf et al. | |
| 2004/0185317 | A1 | 9/2004 | Aoyagi et al. | |
| 2005/0266285 | A1* | 12/2005 | Edlund et al. | 429/25 |
| 2008/0096057 | A1* | 4/2008 | Bono | 429/9 |
| 2010/0291450 | A1 | 11/2010 | Aoyagi et al. | |
| 2010/0332063 | A1 | 12/2010 | Saeki et al. | |
| 2011/0111318 | A1 | 5/2011 | Bernard et al. | |

FOREIGN PATENT DOCUMENTS

EP    2 241 473 A1    10/2010
EP    2 320 504 A1    5/2011

OTHER PUBLICATIONS

European Search Report issued Nov. 2, 2011 in corresponding European Application No. 11 16 8535 filed on Jun. 1, 2011 (with an English Translation).

* cited by examiner

*Primary Examiner* — Ula C Ruddock
*Assistant Examiner* — Lisa S Park Gehrke
(74) *Attorney, Agent, or Firm* — Oblon, Spivak, McClelland, Maier & Neustadt, L.L.P.

(57) ABSTRACT

A method for managing the operation of a hybrid continuous current supply, said supply including a fuel cell stack a battery and a DC/DC converter including an input and an output, the converter input being connected to the output of the fuel cell stack and the output being connected to a variable load in parallel to the battery, the fuel cell stack being formed of a plurality of electrochemical cells adapted to produce electricity from a fuel and an oxidising gas.

13 Claims, 4 Drawing Sheets

METHOD FOR MANAGING THE OPERATION OF A HYBRID SYSTEM

This application claims priority from European Patent Application No. 11168535.0 filed Jun. 1, 2011, the entire disclosure of which is incorporated herein by reference.

The present invention concerns a method for managing the operation of a hybrid continuous current supply, said power supply including a fuel cell stack, a battery and a DC/DC converter comprising an input and an output, the converter input being connected to the fuel cell stack output and the output being connected to a variable load in parallel with the battery, the fuel cell stack being formed of a plurality of electrochemical cells adapted to produce electricity from a fuel and an oxidizing gas.

BACKGROUND OF THE INVENTION

Assemblies of electrochemical units connected in series (often called stacks) are known. The electrochemical units thus assembled may be formed for example by accumulator elements, or by fuel cells. A fuel cell is an electrochemical device for converting chemical energy directly into electrical energy. For example, one type of fuel cell includes an anode and a cathode between which a proton exchange membrane is arranged, often called a polymer electrolyte membrane. This type of membrane only allows protons to pass between the anode and the cathode of the fuel cell. At the anode, diatomic hydrogen undergoes a reaction to produce $H^+$ ions which will pass through the polymer electrolyte membrane. The electrons generated by this reaction join the cathode by a circuit external to the fuel cell, thus generating an electric current. Because a single fuel cell generally only produces a low voltage (around 1 volt), fuel cells are often series-connected to form fuel cell stacks able to generate a higher voltage comprising the sum of the voltages of each cell.

When used within the automobile industry, these fuel cell stacks are usually associated with a battery to form a hybrid system. This system connects the fuel cell stack and the battery in parallel so that the fuel cell stack and the battery simultaneously or separately power the car, via a common section called the bus. This hybridization also allows the fuel cell stack to recharge the battery. A hybrid system is called "active" when it uses a DC/DC converter connected at the fuel cell stack output as seen in FIG. 1. This DC/DC converter is used to adapt the voltage levels of the fuel cell stack and the battery and to regulate the power delivered by the fuel cell stack.

Regulating the power requires the implementation of a control strategy to distribute the power between the fuel cell stack and the battery according to the power requirement of the electric engine of the car and system constraints. System constraints which the control strategy has to take into account are the maximum voltages and currents of the fuel cell stack and the battery, the temperature ranges which must not be exceeded, the battery state of charge, i.e. for example, the battery must not be charged when it is already 100% charged, etc. . . .

One of the control strategies for this hybrid system consists in regulating the battery state of charge around a nominal value without ever reaching the maximum or minimum charge of said battery. Thus, the battery never needs to be charged externally, since it is recharged by the fuel cell stack and possibly by recuperating kinetic energy from the vehicle when the latter is in a braking phase. This means that the fuel cell stack supplies the mean power consumed by the electric engine of the vehicle, whereas the battery is used as an energy buffer means of charging or discharging energy. This strategy is implemented by regulating the bus voltage at a constant value using the DC/DC converter.

One drawback of this known strategy is that nothing is implemented to prevent the fuel cell stack from operating at open circuit voltage ("OCV"). "Open circuit voltage" means the area of operation in which the voltage per cell is higher than 0.85-0.9V/cell. This voltage is known to considerably reduce the lifetime of the fuel cell stack. It is therefore undesirable for the fuel cell stack to operate in this mode.

The open circuit voltage operating mode may occur when the fuel cell stack is only controlled with a constant pressure current. This control method is derived from the idea consisting in reducing the operating pressure of the fuel cell stack to low power to avoid the OCV range. However, it must be considered that the dynamics of pressure variation are much slower than the dynamics of current variation (on the order of a second for pressure and a millisecond for current). It must also be considered that a decrease in the fuel cell stack pressure can only occur if current is consumed, and the current value directly influences the pressure reduction speed. Thus, if the fuel cell stack power varies instantaneously (or quickly) from several kilowatts to 0 kW, it will not be possible to avoid the OCV range, since there will no longer be any current to reduce pressure and the fuel cell stack will be damaged.

SUMMARY OF THE INVENTION

It is an object of the present invention to provide a method for managing the operation of a hybrid system, comprising a fuel cell stack and a battery, which optimises the performance of the hybrid system and increase the lifetime of the fuel cell stack.

The invention therefore concerns a method for managing the operation of a hybrid continuous current supply according to the annexed claim 1.

One advantage of the present invention is providing a longer lifetime for the fuel cell stack. Indeed, by opting for a different regulating method depending on whether the hybrid system is in low power mode or high power mode, the system takes advantage of both regulating modes yet avoids their drawbacks. Indeed, regulation using pressure variation is advantageous at low power since low power means that the current is low. Thus, the difference in reactivity between the current variation and pressure variation is not felt at low power, whereas at high power, i.e. with a high current, this difference may lead to the hybrid system entering the OCV range.

Advantageous embodiments of the method of the present invention form the subject of the annexed dependent claims.

A first advantageous embodiment is defined by claim 2.

In a second advantageous embodiment according to claim 3, the variable representative of the variable load is the difference between a third reference value and the measured battery voltage.

In a third advantageous embodiment according to claim 4, the variable representative of the variable load is the difference between the power required by the variable load and the fuel cell output power.

In another advantageous embodiment, the second critical value is 2.45 bar.

In another advantageous embodiment, the first predetermined critical value is 0.845 volts.

In another advantageous embodiment, the second reference value is 0.85 volts per cell.

In another advantageous embodiment, the first reference value is 2.5 bar.

In another advantageous embodiment, the fuel cell stack uses hydrogen as fuel and oxygen as oxidising gas.

The present invention also concerns a hybrid system including a fuel cell stack comprising a plurality of cells in series using a reducing fuel and an oxidising agent to provide a fuel cell voltage, and a battery providing a battery voltage, connected in parallel to a variable load, the fuel cell stack being connected to the variable load via a DC/DC converter which controls said fuel cell stack. The hybrid system uses the operating method which is the subject of this invention in order to operate.

BRIEF DESCRIPTION OF THE DRAWINGS

The objects, advantages and features of the hybrid system according to the present invention will appear more clearly in the following detailed description of at least one embodiment of the invention, given solely by way of non-limiting example and illustrated in the annexed drawings, in which.

DETAILED DESCRIPTION OF THE INVENTION

In the following description, all those parts of the fuel cell stack that are well known to those skilled in this technical field will be described only in a simplified manner.

Figure 1:
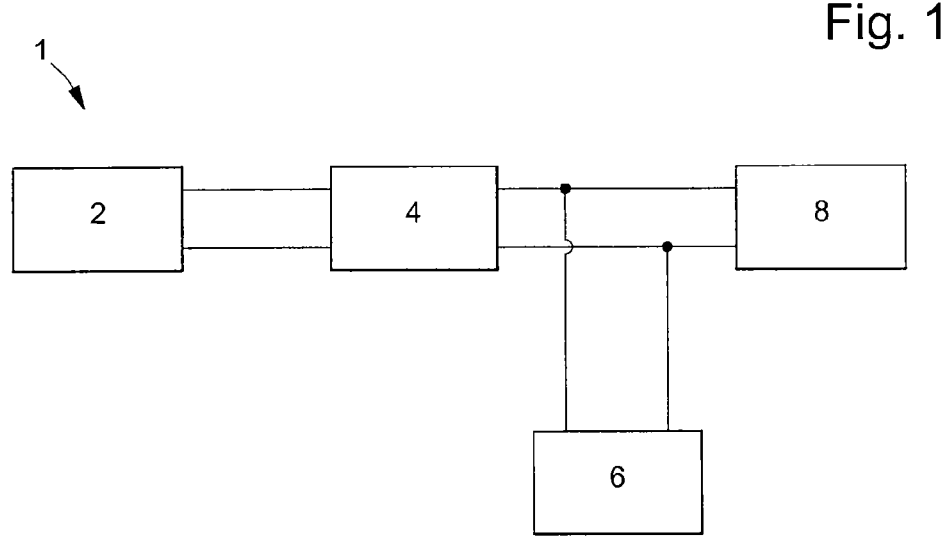
FIG. 1 is a schematic view of a known hybrid system.

FIG. 1 shows a schematic view of a hybrid system 1 according to the present invention. This hybrid system 1 includes a fuel cell stack 2, i.e. a plurality of series-mounted electrochemical cells. This fuel cell stack 2 is powered by a reducing fuel such as hydrogen and by an oxidising agent such as oxygen. The reaction between the reducing fuel and the oxidising agent generates the fuel cell voltage. The gases derived from the reaction between the reducing fuel and the oxidising agent may be evacuated via recirculation circuits equipped with recirculation pumps. Hybrid system 1 also includes a means of storing energy 6 such as one or several batteries. In the remainder of the description, this means of storing electrical energy will be assumed to be a battery 6 but there is nothing to prevent several batteries being used. This battery 6 provides a battery voltage and is connected in parallel to fuel cell stack 2 so that fuel cell stack 2 and battery 6 are both connected to a variable load 8. This variable load 8 may be, for example, a car engine.

This hybrid system 1 also includes a DC/DC converter 4 comprising two inputs and two outputs. The outputs of fuel cell stack 2 are connected to the two inputs of the DC/DC converter 4, which therefore means that the voltage supplied by the fuel cell stack 2 enters DC/DC converter 4. The connection points of variable load 8 and battery 6 are connected to the two outputs of DC/DC converter 4.

DC/DC converter 4 is also arranged to control hybrid system 1 since DC/DC converter 4 is capable of adapting the voltage level of fuel cell stack 2 and also that of battery 6. Likewise, the DC/DC converter can regulate the power delivered by fuel cell stack 2.

Indeed, the role of DC/DC converter 4 is to control hybrid system 1 so that battery 6 and fuel cell stack 2 operate together to power load 8. The function of the DC/DC converter is also to distribute the power supplied by the fuel cell stack between the load, which is the engine in an automobile application, and the battery. The control of hybrid system 1 is of course subject to constraints, which are the voltage and current limits of fuel cell stack 2, the voltage and current limits of battery 6, the state of charge limits of battery 6, the temperature limits that must not be exceeded etc.

One control strategy is to regulate the state of charge of battery 6 around a nominal value without ever reaching the maximum or minimum charge limit. In other words, the battery never needs to be charged externally and it is recharged by the fuel cell stack and the recuperation of kinetic energy during braking phases in the case of a vehicle. One consequence of this strategy is that fuel cell stack 2 responds to the mean engine energy requirement and battery 6 acts as an energy buffer means of charging or discharging energy. This strategy is implemented by DC/DC converter 4.

According to the invention, DC/DC converter 4 is arranged so that hybrid system 1 operates in two operating modes so as to avoid the open circuit voltage mode. It will be recalled that this mode occurs when the power produced by fuel cell stack 2 is low and is characterized by a cell voltage of more than 0.85 volts. This mode then causes damage to the cells of fuel cell stack 2 and reduces the lifetime of the stack.

Figure 6:
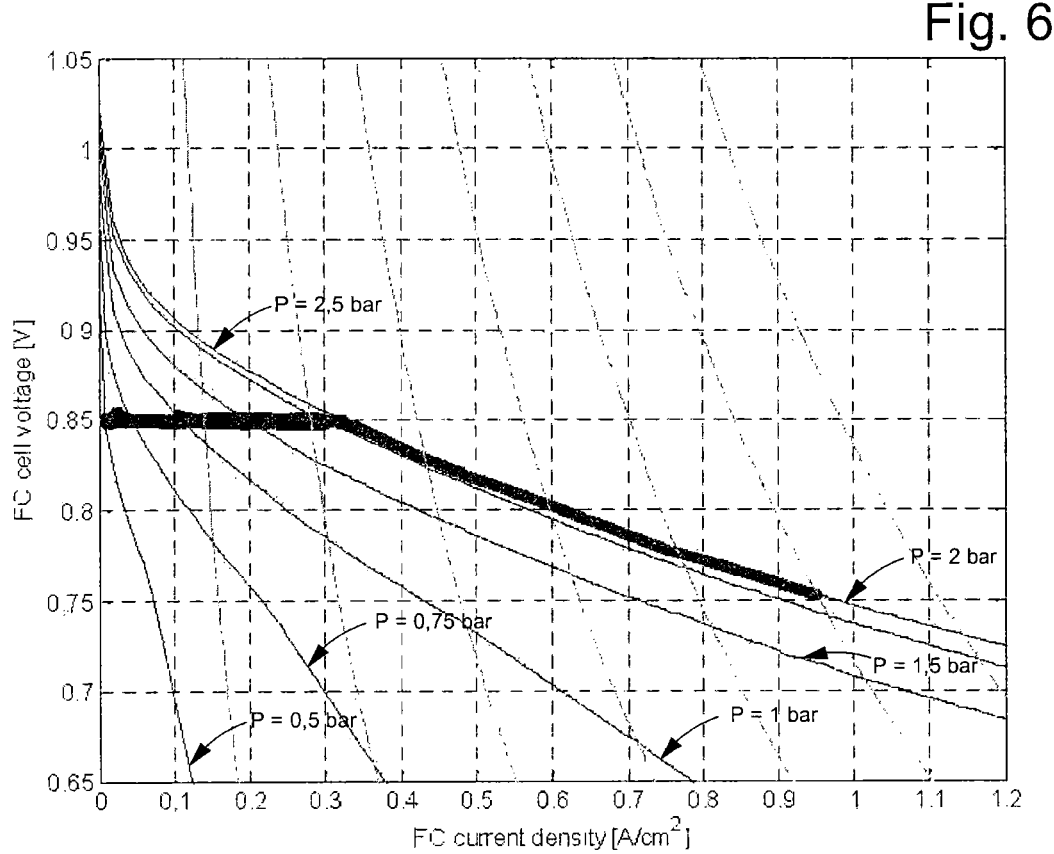
FIG. 6 shows the operating points of the fuel cell stack when operating according to the implementation of the present invention shown in FIG. 4.

A fuel cell stack is characterized by the relation between the voltage at the terminals of the cells forming said stack and the current that it produces. Indeed each fuel cell stack 2 is characterized by the relation between the current and the cell voltage, i.e. for a given current, each cell produces a voltage the value of which is linked to said given current. It is thus observed that the voltage Vcell at the cell terminals decreases when the current increases. This current/cell voltage relation is even more complex in that it also depends on pressure. This means that the performance of fuel cell stack 2 depends on the reducing fuel pressure and the oxidising gas injected into said fuel cell stack. The result of this variation in performance with pressure is that a current/cell voltage relation exists for each pressure. It is observed in FIG. 6, which shows the cell voltage-current characteristic for various pressures, that the higher the pressure, the smaller the slope of the cell voltage-current curve will be. Moreover, it is observed that, for a given current, the higher the pressure P, the higher the cell voltage will be.

Figure 2:
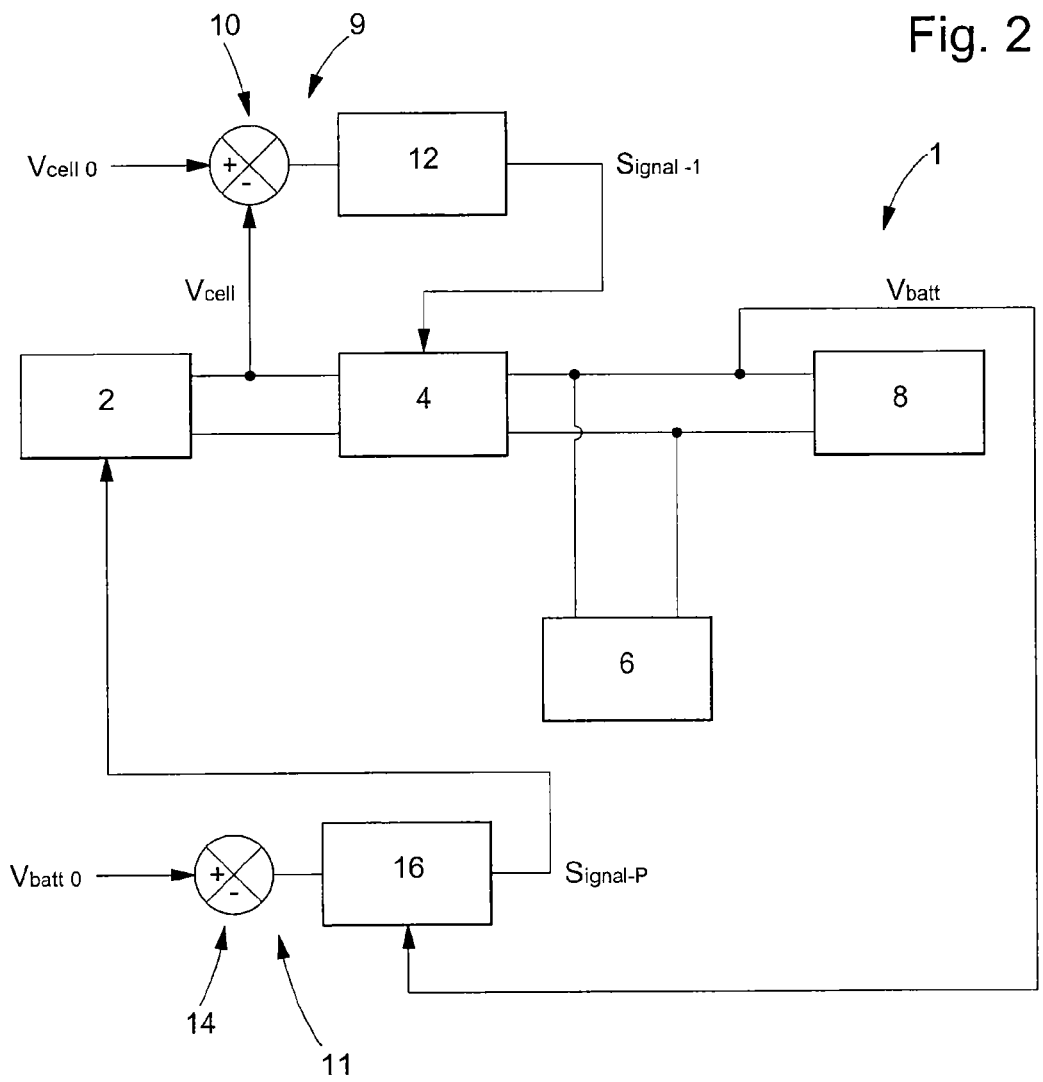
FIG. 2 is a schematic view of the hybrid system operating in accordance with a first embodiment of the present invention.

The first operating mode is the low power operating mode of hybrid system 1. This first operating mode has a specific regulation method which consists in regulating the voltage of battery 6 and the voltage of fuel cell stack 2. This regulation is performed using first 9 and second 11 regulation loops seen in FIG. 2.

The first regulating loop 9 includes a first comparator 10, which compares a second reference value, serving as reference voltage Vcell0 for the fuel cell stack, with the measured voltage Vcell of the fuel cell stack, i.e. the output voltage of fuel cell stack 2. This means that the fuel cell reference voltage Vcell0 is connected to the positive input of first comparator 10 and that the measured fuel cell voltage Vcell is connected to the negative input of first comparator 10. The output of first comparator 10 is connected to a first voltage controller 12. This first voltage controller 12 is arranged to control and analyse the data derived from the comparison between the fuel cell reference voltage Vcell0 and the measured fuel cell voltage Vcell and to provide an instruction or desired Signal-1 to the DC/DC converter 4. This instruction Signal-1 controls the value of the current fed into fuel cell stack 2. This current acts on the impedance of DC/DC converter 4 which in turn acts on the voltage of each cell of fuel cell stack 2. Consequently, regulating the current of DC/DC converter 4 allows the voltage of each cell of fuel cell stack 2 to be regulated at a predetermined value. In the present example, the voltage of each cell will be regulated at a second reference value of 0.85 volts per cell which is a nominal operating value. Of course, this value may be different depending on the type of fuel cell stack used. This regulation protects the fuel cell stack from the open circuit voltage range.

The second regulating loop 11 is used for power variation. This second loop 11 includes a second comparator 14, which compares a reference battery voltage Vbatt0 with a measured battery voltage Vbatt. This means that reference battery voltage Vbatt0 is connected to the positive input of second comparator 14 and the measured battery voltage Vbatt is connected to the negative input of the second comparator. The output of second comparator 14 is connected to a second voltage controller 16. This second voltage controller 16 is arranged to analyse the data derived from the comparison between reference battery voltage Vbatt0 and measured battery voltage Vbatt and to act on the fuel cell stack pressure. To achieve this, second voltage controller 16 provides a signal Signal-P which acts on the valves to increase or decrease pressure. The fact of acting on pressure controls the power of fuel cell stack 2, since at constant cell voltage, the change of pressure means a change in the cell voltage-current curve. Increasing pressure increases current and vice versa. Regulation of battery voltage Vbatt is useful for the control strategy of hybrid system 1. Indeed, the battery voltage is regulated at its nominal value so that battery 6 never needs to be charged externally, since it is recharged by fuel cell stack 2 and by the recuperation of kinematic energy from the vehicle during the braking phase. Consequently, the fuel cell stack 2 supplies the mean power of electric engine 8 of the vehicle, whereas battery 6 is used as an energy buffer means of charging or discharging energy.

Thus, during operation in low power mode or Mode 1, the cell voltage Vcell of the fuel cell stack is regulated to a second reference value of 0.85 volts per cell and the variation in power occurs by varying pressure. An operating mode is thus obtained which allows the cell voltage to be no higher than 0.85 volts per cell and thus does not damage the cells since the fuel cell stack does not enter the open circuit voltage range.

However, regulating the fuel cell stack cell voltage Vcell at a constant value reduces yield since the voltage at the terminals of each cell is restricted. The fuel cell stack yield is maximum when pressure P is maximum. In the present case, a decrease in yield is acceptable since this first operating mode is characterized by low power. A lower yield is acceptable in this first regulating mode given that the drop in yield has limited consequences. For example, for a maximum theoretical power of 500 watts in this first operating mode, a yield that changes from 90% to 85% would change the power supplied from 450 watts to 425 watts.

The second operating mode or mode 2 is the operating mode of hybrid system 1 when the latter operates in high power. This second operating mode consists in imposing fuel cell stack pressure P and in regulating the cell voltage Vcell of fuel cell stack 2 seen in FIG. 3.

Figure 3:
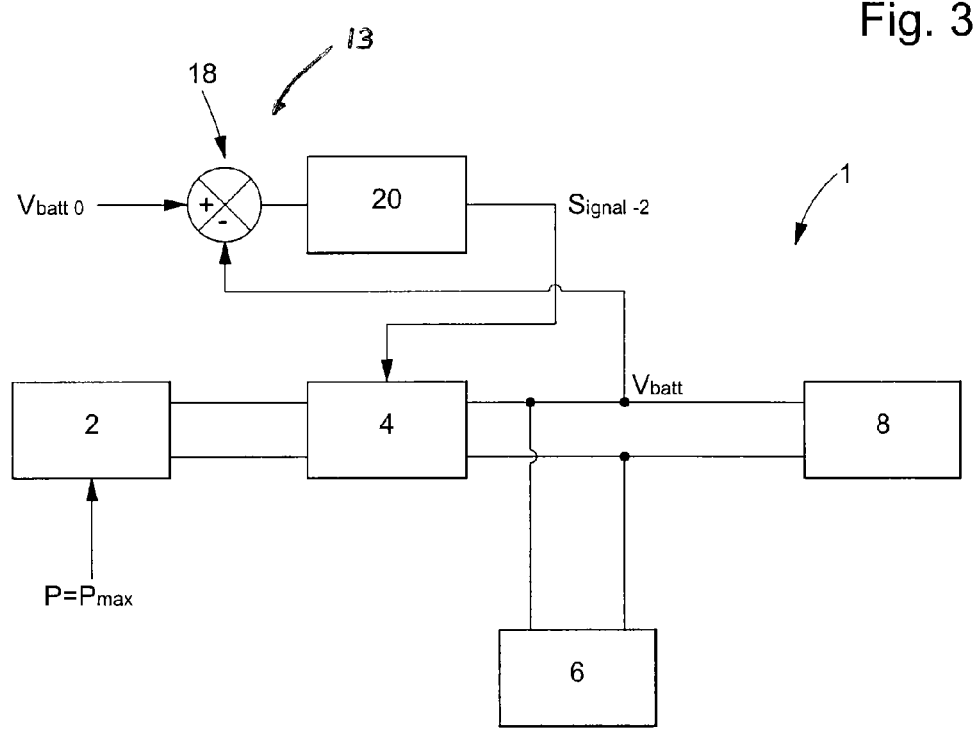
FIG. 3 is a schematic view of the hybrid system operating in accordance with a second operating mode of the present invention.
Figure 4:
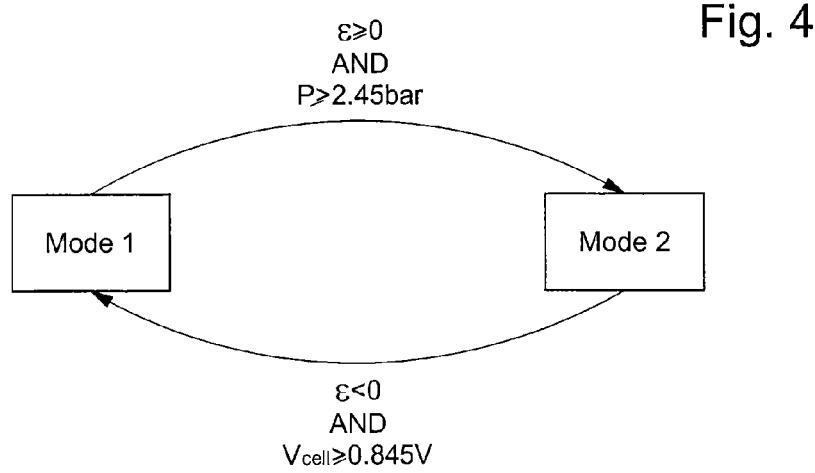
FIG. 4 is a schematic view of the transition conditions between the two operating modes according to one implementation of the present invention.

In this second operating mode, there is a third regulating loop 13, seen in FIG. 3. It includes a third comparator 18 comparing a battery voltage set point Vbatt0 to a measured battery voltage Vbatt, i.e. the battery output voltage. This means that the battery voltage set point Vbatt0 is connected to the positive input of the third comparator 18 and the measured battery voltage Vbatt is connected to the negative input of third comparator 18. The output of third comparator 18 is connected to a third voltage controller 20. This third voltage controller 20 is arranged to analyse the data derived from the comparison between battery voltage set point Vbatt0 and measured battery voltage Vbatt and to supply a signal Signal-2 to the DC/DC converter 4. This purpose of this signal Signal-2 is to vary the current of fuel cell stack 2 by acting on the voltage of each cell of fuel cell stack 2, which consequently protects battery 6. This regulating loop 13 is similar to the second regulating loop 11 used for varying pressure P and thus power in the first operating mode. In a variant it could be envisaged that second regulating loop 11 and third regulating loop 13 have as common elements voltage comparator 18 or 14 and voltage controller 16 or 20. The voltage controller includes a selecting means for supplying either signal Signal-1 when the system is operating in the first operating mode, or signal Signal-2 when system 1 is operating in the second operating mode. This arrangement requires fewer components. In parallel to this control, pressure P of the reducing fuel, i.e. hydrogen and the pressure of the oxidising gas, i.e. oxygen are kept constant at a maximum pressure level Pmax. This maximum pressure Pmax can thus provide a maximum yield for fuel cell stack 2.

Of course, other types of regulation may be used to perform the method according to the present invention and the examples cited are in no way limiting.

There is thus obtained a hybrid system 1 operating in two operating modes: a first operating mode where the voltage is constant and pressure P is variable and a second operating mode where the voltage is variable and pressure P is constant. This system 1 both protects fuel cell stack 2 from the open circuit voltage range in the first operating mode and protects battery 6 from overcharging in the second operating mode. However, preferably, protection of battery 6 will take priority over protection of fuel cell stack 2, so that in the event of a current return from variable load 8 to hybrid system 1, the current will be sent to fuel cell stack 2 and not into battery 6. This is due to the danger of overcharging battery 6. In particular, for a battery 6 used in a hybrid system 1 for an automobile, overcharging battery 6 may cause the latter to explode. For reasons of safety, it is thus preferable to damage fuel cell stack 2 rather than battery or batteries 6.

This hybrid system 1 according to the present variant changes from one operating mode to another when conditions for transition are combined. There are two transition conditions, a first which, when achieved, changes hybrid system 1 from the first operating mode to the second operating mode and a second which, when achieved, changes hybrid system 1 from the second operating mode to the first operating mode.

The first transition uses two variables which must satisfy two conditions for hybrid system 1 to be able to change from the first to second operating mode. The first of these conditions is a pressure condition. This pressure condition is only achieved when pressure P in the fuel cell stack is higher than or equal to a second critical value of 2.45 bar. Indeed, in the first operating mode called low power mode, the variation in power occurs by varying pressure P so that an increase in pressure P causes an increase in power and vice versa. Since the voltage at the terminals of each cell is regulated at the second reference value, which is 0.85 volts here, a power limit is reached when pressure P is maximum. Nonetheless, this limit is not the maximum power that fuel cell stack 2 can provide. The operating mode must therefore be changed to enter an operating mode allowing more power to be supplied. This is the second operating mode described above.

However, there must be a signal indicating that more power is required. Indeed, if the change from the first operating mode to the second operating mode was made simply when pressure P achieved maximum pressure, this could lead to concerns as to untimely switching from one mode to the other when hybrid system 1 wished to operate for power supplied when the voltage is equal to 0.85 volts and for pressure P having the maximum pressure value. A peak in pressure P would cause such a switch. An additional condition must therefore be set in place representative of the power requirement. This condition indicates that hybrid system 1 needs to supply more or less power. This condition may consist in the difference in voltage E between the battery set point value Vbatt0 and the measured battery voltage value Vbatt. This voltage condition is representative of the desired power since the charge of battery 6 is controlled so that said battery is never overcharged. Thus, if battery 6 is sufficiently charged, its requirement for power is less or zero and the power must then be decreased. In the case of the first transition, the voltage condition which becomes a power condition will be satisfied if the difference ϵ between the battery voltage set point Vbatt0 and the measured battery voltage Vbatt is greater than zero. This means that hybrid system 1 requires an increase in power. Thus, when the first and second conditions are fulfilled, the transition between the first operating mode and the second operating mode is carried out, and hybrid system 1 starts to operate in the second operating mode which allows more power to be supplied to hybrid system 1.

In the case of the second transition, there are also two conditions. A first condition is the condition representative of the power requirement i.e. the difference ϵ between the voltage set point or reference voltage Vbatt0 of battery 6 and the measured battery voltage Vbatt is less than zero. This means that hybrid system 1 is trying to decrease power. This voltage condition is associated with a second condition which is a voltage condition. This voltage condition is only achieved when the voltage of each of the cells of the fuel cell stack is higher than or equal to a first critical value which is 0.845 volts. Indeed, in high power mode, the variation in power is achieved by decreasing the voltage at the terminals of each cell. In this mode, fuel cell stack 2 operates following the cell voltage-current curve for the maximum pressure Pmax. In this case, the more the voltage at the terminals of each cell decreases, the more the current and thus the power increases. Conversely, when the voltage at the terminals of each cell increases, the current decreases and the power also decreases. In the event of a decrease in power, the voltage at the terminals of each cell increases and this decrease may go as far as to cause a voltage of close to 0.85 volts at the terminals of each cell, which is the limit that must not be exceeded. If hybrid system 1 requires still lower power, it must change into the first operating mode. Thus, when the first and second conditions are fulfilled, the transition between the second operating mode and the first operating mode is carried out, with hybrid system 1 operating in the first operating mode.

However, if the difference E between battery voltage set point Vbatt0 and measured battery voltage Vbatt is equal to zero, the hybrid system understands that the power supplied is necessary. Consequently, hybrid system 1 ensures that teh current value and pressure value are set and held constant while the difference ϵ between the reference battery voltage Vbatt0 and the measured battery voltage Vbatt is equal to zero.

The values of the first and second critical values of 0.845 volts and 2.45 bar are selected to be different from 0.85 volts and 2.5 bar for safety reasons. Indeed, a hysteresis is artificially created to prevent an untimely change of operating mode. If the threshold pressure value P were selected to be 2.5 bar, there would be a change of operating mode if the pressure dropped to 2.495 bar. It can then be considered that the voltage of 0.845 volts and the pressure of 2.5 bar may be written 0.85 V-x and 2.5 bar-x where x has an adjustable value. The hysteresis thus means these small variations can be removed and thus the operating method is made more stable. It will be clear that the values of the first and second critical values, respectively of 0.845 V and 2.45 bar are not limiting and that other values may also be selected.

Of course, the power set point is not necessarily the difference E between the reference battery voltage Vbatt0 and the measured battery voltage Vbatt. This power set point may be a set point linked to the measured power according to the current and voltage produced by fuel cell stack 2. This set point representative of the power requirement could be the position of the pedal. Thus, if the system detects that the accelerator pedal is not in its rest position, it deduces that power is necessary. Conversely, if the system detects that the accelerator pedal is in its rest position, system 1 concludes that there is zero power requirement and that the power can be decreased.

The different steps of the operation management method according to the invention are:

a) Supplying a flow of fuel gas and a flow of oxidising gas to each of the electrochemical cells so that the chemical reaction producing electricity can occur.

b) Defining a set point representative of the variable load or power requirement. This set point may be the difference between a predetermined battery voltage set point value and the measured battery voltage.

c) Monitoring the fuel gas pressure and the oxidising gas pressure in fuel cell stack 2 using a pressure sensor. This means that the pressure in fuel cell stack 2 is continuously known. Several sensors provide a mean value of this pressure and thus more reliable pressure values.

d) Regulating the pressure in fuel cell stack 2 at a first reference value. Pressure P in fuel cell stack 2 is kept at its maximum value Pmax so as to obtain the maximum power from the fuel cell stack. The first reference value is 2.5 bar.

e) Distributing the variable load between fuel cell stack 2 and battery 6 as a function of the set point, by varying the output voltage (Vcell) of the DC/DC converter 4. DC/DC converter 4 acts on the voltage levels of fuel cell stack 2 and particularly on output voltage Vcell of fuel cell stack 2 which is the sum of the voltages at the terminals of each cell. The variation in voltage at the terminals of each cell provides a defined current and thus a defined power.

f) Monitoring a voltage representative of the voltage at the terminals of at least one of the electrochemical cells of the fuel cell stack or also checking whether the output voltage of the fuel cell stack exceeds a first predetermined critical value. It is checked here whether the voltage at the terminals of each cell is close to the value of 0.85 V which is the maximum desired value for this voltage. In the present case, the first critical value is 0.845 V.

g) Monitoring whether the set point representative of the power requirement indicates that less power is required. This is to see whether the system is demanding more or less power. This set point may be the difference between a value of battery voltage set point Vbatt0 and the measured battery voltage Vbatt or the difference between a power set point value and the measured power value.

If the voltage representative of the voltage at the terminals of at least one of the cells exceeds a first predetermined critical value and if the variable indicates a decrease in the variable load:

h) Interrupting the step of maintaining the pressure in the fuel cell stack at a reference value and interrupting the step of varying and regulating the output power of the fuel cell stack by varying the output voltage of the fuel cell stack via the DC/DC converter.

i) Regulating the voltage representative of the voltage at the terminals of at least one of the cells at a second reference value by adapting the input impedance of the DC/DC converter. The second reference value is 0.85 V.

j) Distributing the variable charge between the fuel cell stack and the battery by varying the pressure. i.e. varying the output power of the fuel cell stack by varying pressure. When the voltage at the terminals of each cell is constant, the current regulation which allows power to be regulated is dependent on pressure. There is a curve of the cell terminal voltage according to current for each pressure. Since, with a fixed current, the voltage at the terminals of each cell increases with pressure, it follows that with a fixed voltage at the terminals of each cell, the current increases with pressure.

If the pressure in the fuel cell stack exceeds a second predetermined critical value and if the set point indicates an increase in the variable load:

k) Interrupting operation (i) and interrupting operation (j) and repeating operation (d) and operation (e).

Figure 5:
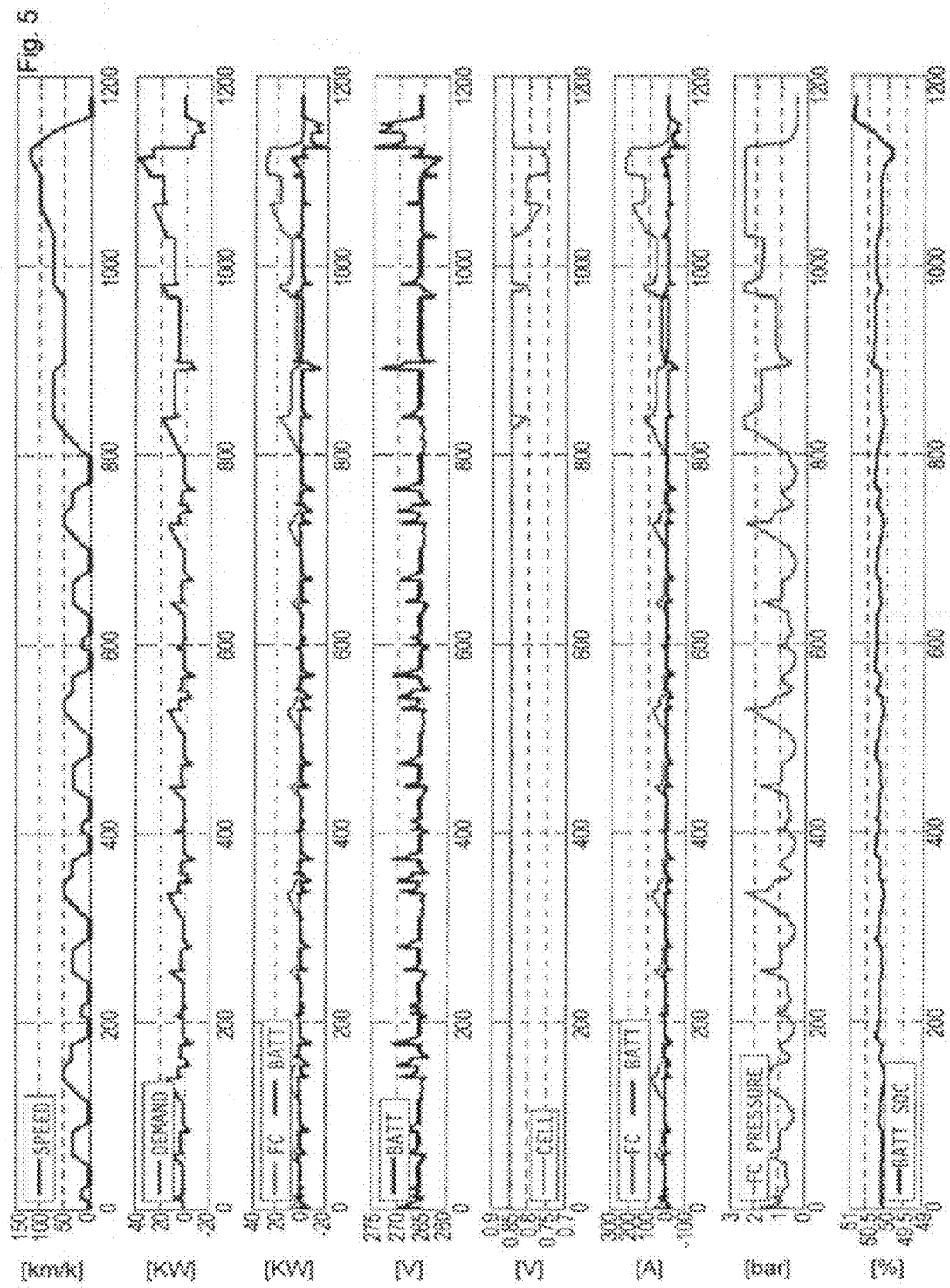
FIG. 5 shows a simulation of the hybrid system operation according to the present invention.

FIG. 5 thus shows curves representing the different characteristic variables of hybrid system 1 in simulated operation.

It will be clear that various alterations and/or improvements and/or combinations evident to those skilled in the art may be made to the various embodiments of the invention set out above without departing from the scope of the invention defined by the annexed claims.

What is claimed is:

1. A method for managing the operation of a hybrid continuous current supply, said supply comprising a fuel cell stack, a battery and a DC/DC converter including an input and an output, the converter input being connected to an output of the fuel cell stack and the converter output being connected to a variable load in parallel to the battery, the fuel cell stack being formed of a plurality of electrochemical cells adapted to produce electricity from a fuel and an oxidising gas, wherein said method includes the following operations
   a) supplying a flow of fuel and a flow of oxidising gas to each of the electrochemical cells;
   b) defining a set point representative of the variable load;
   c) monitoring the fuel pressure and the oxidising gas pressure in the fuel cell stack
   d) regulating the pressure in the fuel cell stack at a first reference value;
   e) distributing the variable load between the fuel cell stack and the battery as a function of the set point, by varying the output voltage of the DC/DC converter;
   f) monitoring a voltage representative of the voltage at the terminals of at least one of the electrochemical cells of the fuel cell stack;
   g) monitoring the set point representative of the variable load;
   if the voltage representative of the voltage at the terminals of at least one of the cells exceeds a first predetermined critical value and if the set point indicates a decrease in the variable load:
   h) interrupting operation (d) and interrupting operation (e); and
   i) regulating the voltage representative of the voltage at the terminals of at least one of the cells at a second reference value by adapting the input impedance of the DC/DC converter;
   j) distributing the variable load between fuel cell stack and the battery by varying pressure.

2. The managing method according to claim 1, wherein the method further includes the operations of:
   if the pressure in the fuel cell stack exceeds a second predetermined critical value and if the set point indicates an increase in the variable load:
   k) interrupting operation (i) and interrupting operation (j) and repeating operation (d) and operation (e).

3. The management method according to claim 1, wherein the set point representative of the variable load is the difference between a third reference value and a measured battery voltage.

4. The management method according to claim 2, wherein the set point representative of the variable load is the difference between a third reference value and a measured battery voltage.

5. The management method according to claim 1, wherein the set point representative of the variable load is the difference between the power required by the variable load and the output power of the fuel cell stack.

6. The management method according to claim 2, wherein the set point representative of the variable load is the difference between the power required by the variable load and the output power of the fuel cell stack.

7. The management method according to claim 2, wherein the second critical value is 2.45 bar.

8. The management method according claim 4, wherein the second critical value is 2.45 bar.

9. The management method according to claim 6, wherein the second critical value is 2.45 bar.

10. The management method according to claim 1, wherein the first predetermined critical value is 0.845 volts.

11. The management method according to claim 1, wherein the second reference value is a value of 0.85 volts per cell.

12. The management method according to claim 1, wherein the first reference value is 2.5 bar.

13. The management method according to claim 1, wherein the fuel cell stack uses hydrogen as fuel and oxygen as oxidising gas.

* * * * *